United States Patent [19]

Kato

[11] Patent Number: 5,231,534
[45] Date of Patent: Jul. 27, 1993

[54] REAL IMAGE MODE VARIABLE MAGNIFICATION FINDER OPTICAL SYSTEM

[75] Inventor: Shigeru Kato, Tokyo, Japan

[73] Assignee: Olympus Optical Co., Ltd., Tokyo, Japan

[21] Appl. No.: 821,922

[22] Filed: Jan. 16, 1992

[30] Foreign Application Priority Data

Jan. 17, 1991 [JP] Japan ................. 3-017081
Aug. 23, 1991 [JP] Japan ................. 3-212131

[51] Int. Cl.⁵ ............... G02B 15/177; G02B 23/14; G02B 23/02; G03B 13/12
[52] U.S. Cl. ................. 359/432; 359/431; 359/689; 354/222; 354/225
[58] Field of Search .......... 359/432, 431, 434, 422, 359/423, 689, 684, 730, 726, 737, 834, 835; 354/222, 219, 225

[56] References Cited

U.S. PATENT DOCUMENTS

| | | | |
|---|---|---|---|
| 1,091,933 | 3/1914 | Humbrecht | 359/422 |
| 1,490,751 | 4/1924 | Underhill | 359/726 |
| 3,911,457 | 10/1975 | Okuno | 354/225 |
| 4,021,823 | 5/1977 | Miyata | 354/225 |
| 4,545,655 | 10/1985 | Fantone et al. | 359/737 |
| 4,842,395 | 6/1989 | Sato et al. | 359/432 |
| 4,906,078 | 3/1990 | Inabata et al. | |
| 4,992,809 | 2/1991 | Nozaki et al. | 354/222 |
| 5,061,054 | 10/1991 | Ohshita | 359/432 |
| 5,095,326 | 3/1992 | Nozaki et al. | 354/222 |
| 5,144,349 | 9/1992 | Kato et al. | 354/222 |

FOREIGN PATENT DOCUMENTS

| | | |
|---|---|---|
| 63-226616 | 9/1988 | Japan |
| 1-131510 | 5/1989 | Japan |
| 2-173713 | 7/1990 | Japan |
| 2173713 | 7/1990 | Japan |
| 3-4217 | 1/1991 | Japan |

Primary Examiner—Jon W. Henry
Attorney, Agent, or Firm—Cushman, Darby & Cushman

[57] ABSTRACT

A real image mode variable magnification finder optical system includes an objective lens system having a positive refractive power as a whole, an image erecting system for erecting an intermediate image formed by the objective lens system, and an eyepiece system having a positive refracting power as a whole, in which the entrance surface of the image erecting system has a negative refracting power and an intermediate image is formed between the entrance surface of the image erecting system and the eyepiece system. Thus, the real image mode variable magnification finder optical system, although it is such an optical system that an erect image is obtained by a Porro prism system constructed of a plurality of reflecting members, has important advantages in practical use that a finder length is reduced, optical performance is favorable, design is compact, and finder magnification is high.

7 Claims, 15 Drawing Sheets

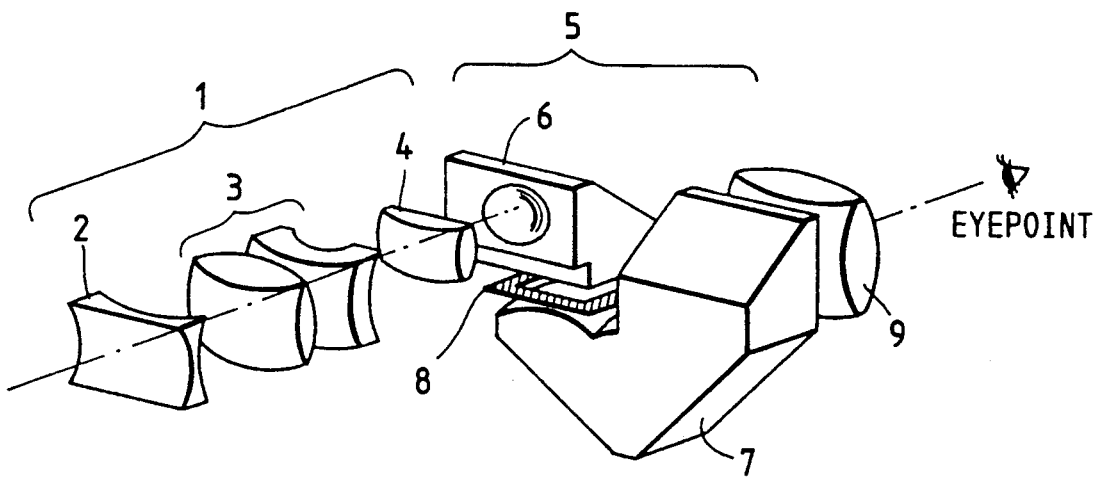
FIG. 1
FIG. 3
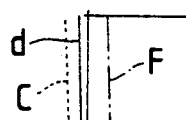
LOW MAGNIFICATION POSITION
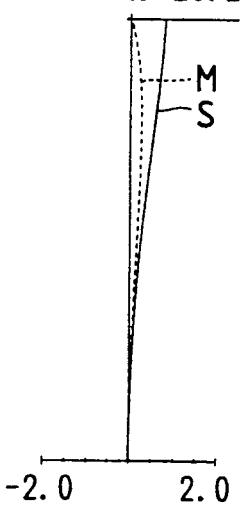
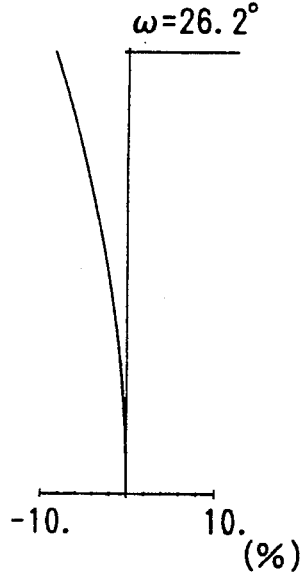

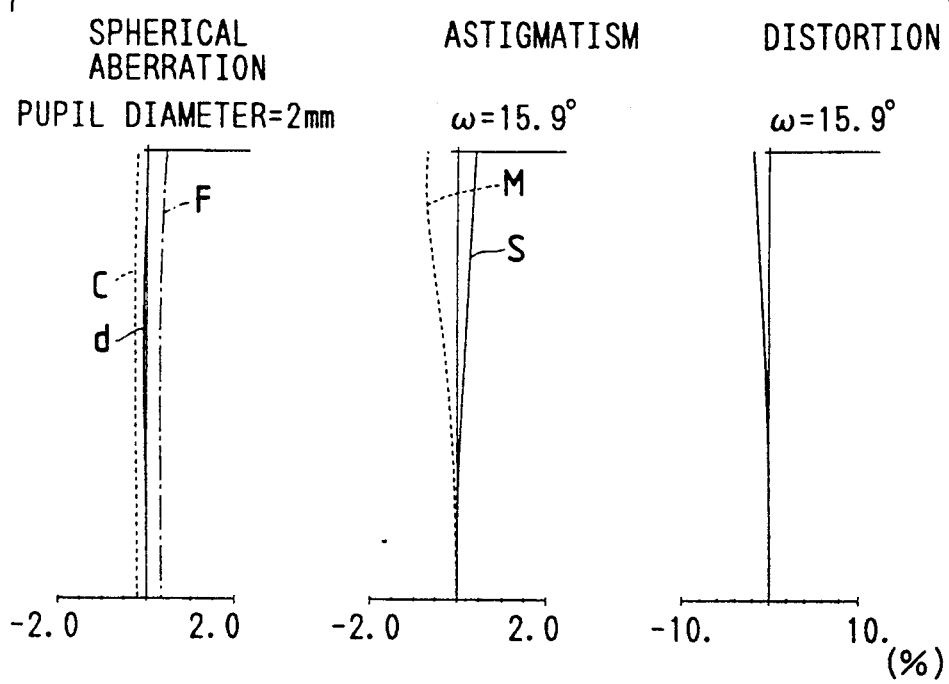
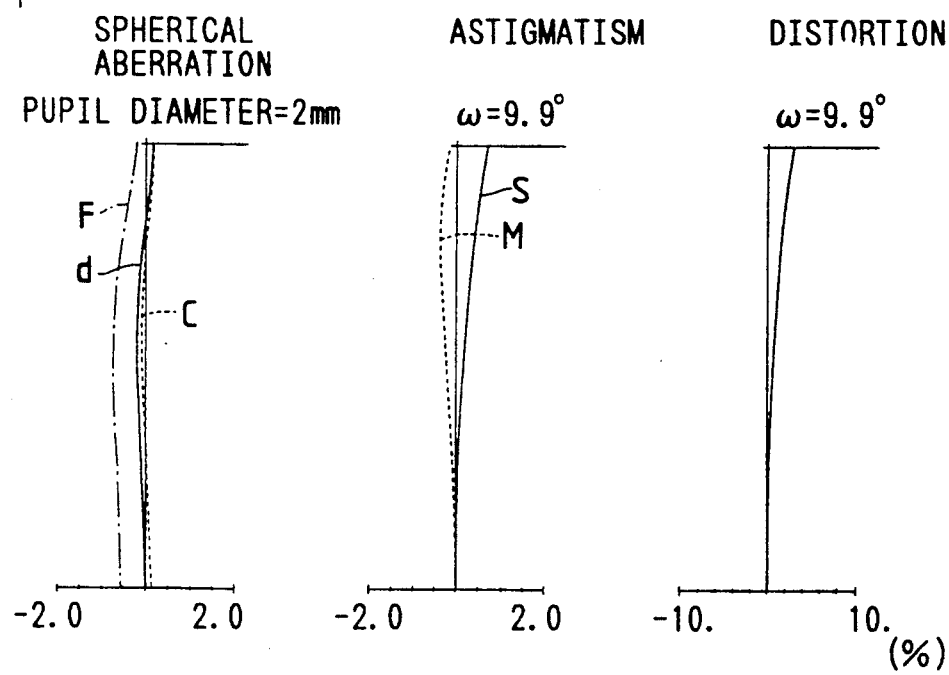

FIG. 6
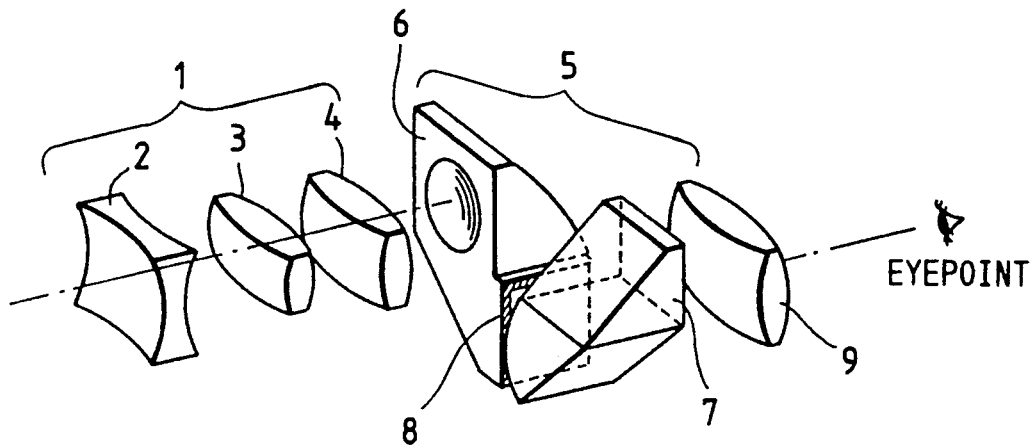
FIG. 8
LOW MAGNIFICATION POSITION
 
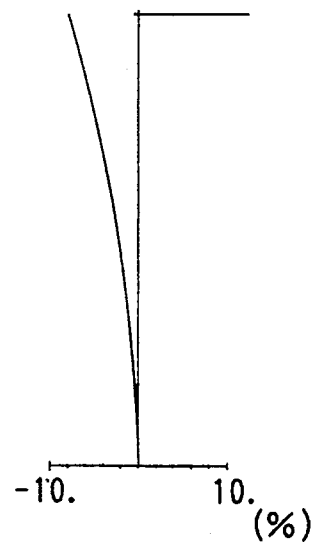

FIG. 7
LOW MAGNIFICATION POSITION
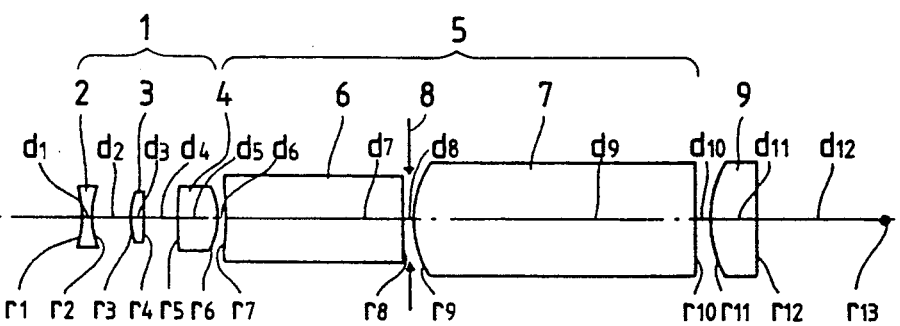
MODERATE MAGNIFICATION POSITION
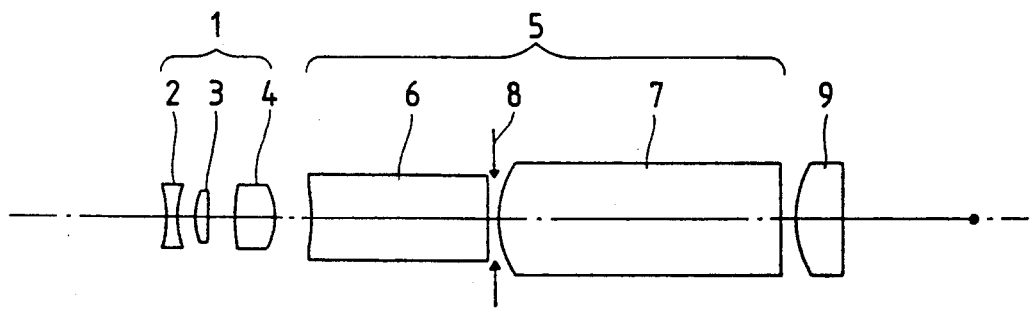
HIGH MAGNIFICATION POSITION
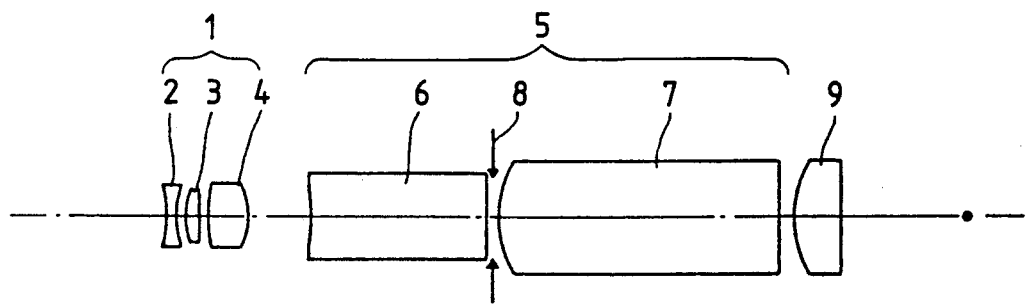

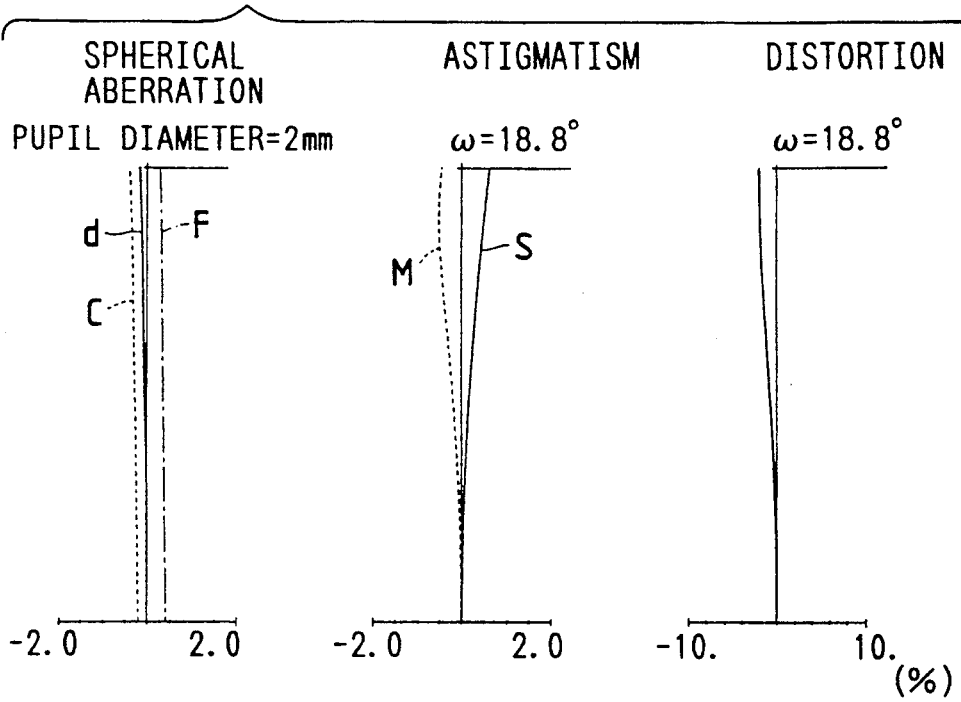
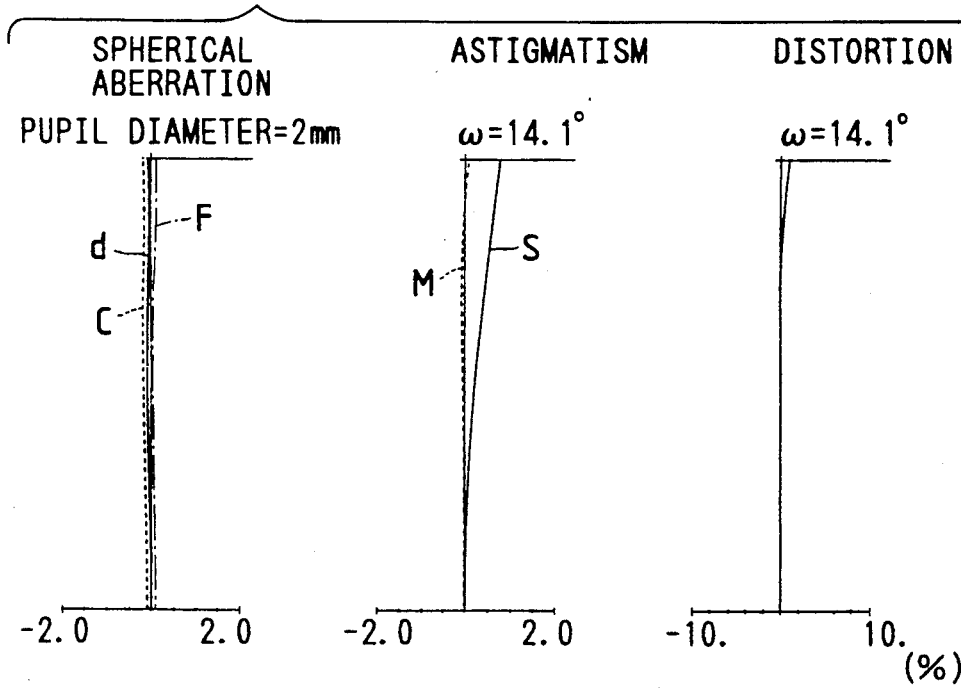

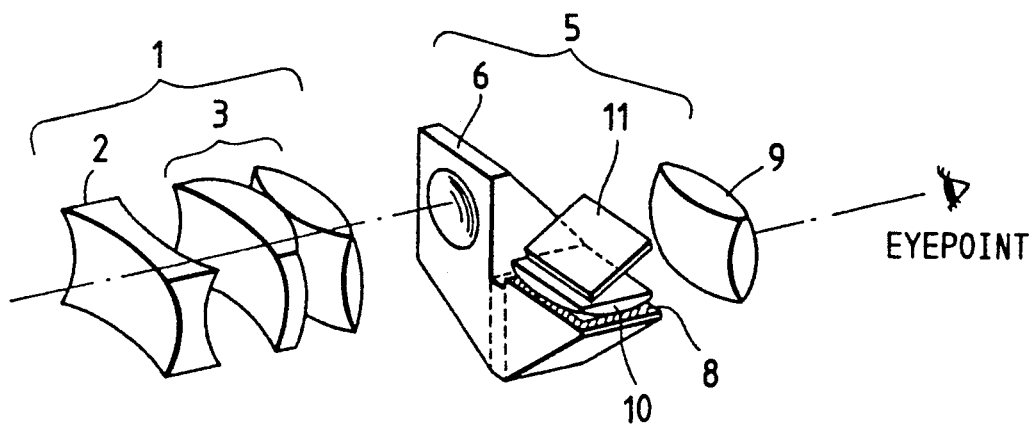
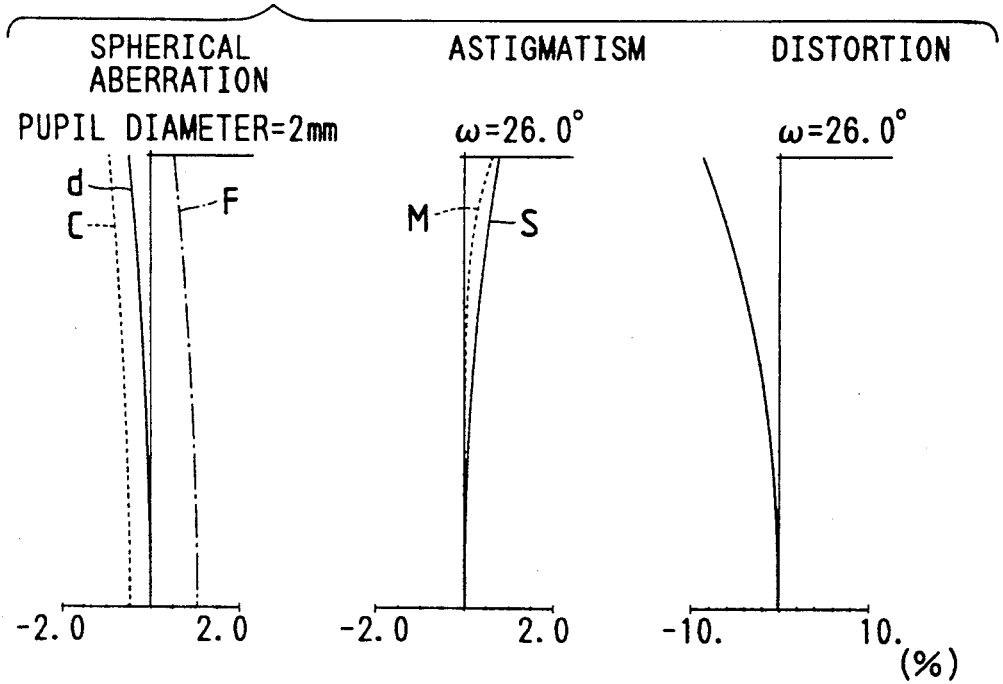

FIG. 12
LOW MAGNIFICATION POSITION
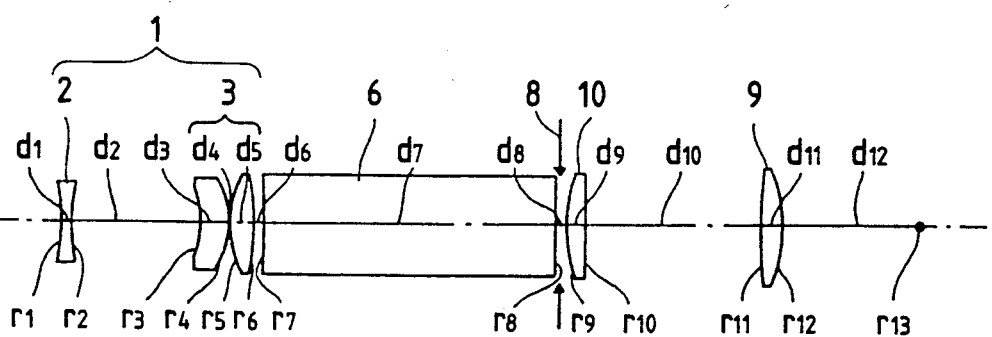
MODERATE MAGNIFICATION POSITION
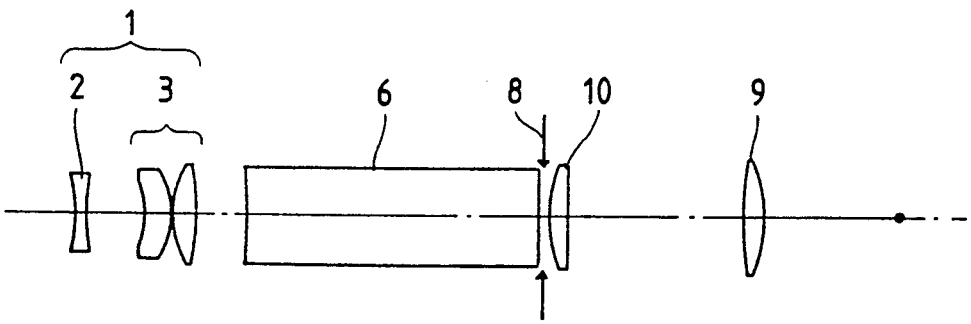
HIGH MAGNIFICATION POSITION
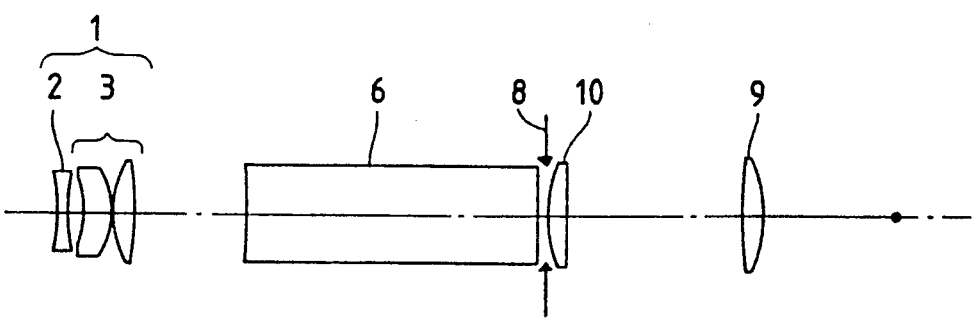

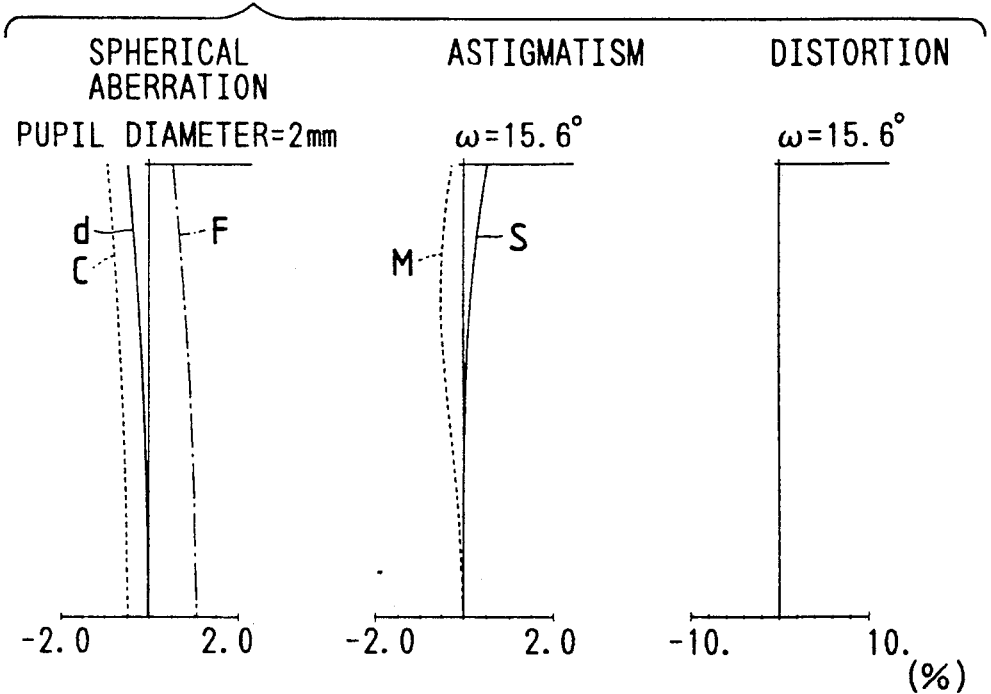
FIG. 14 — MODERATE MAGNIFICATION POSITION
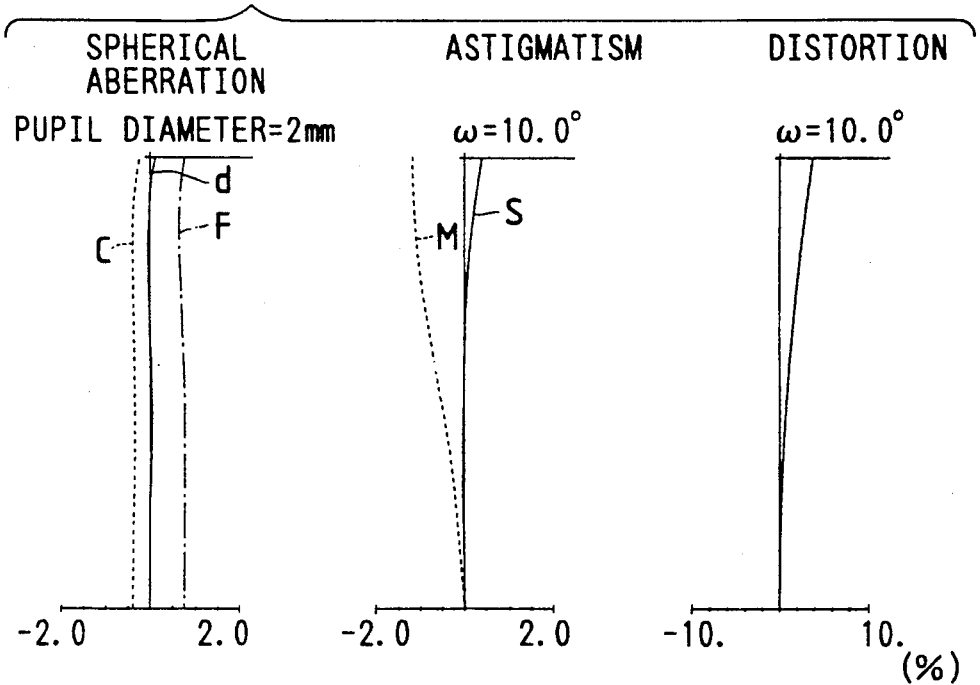
FIG. 15 — HIGH MAGNIFICATION POSITION FIG. 16
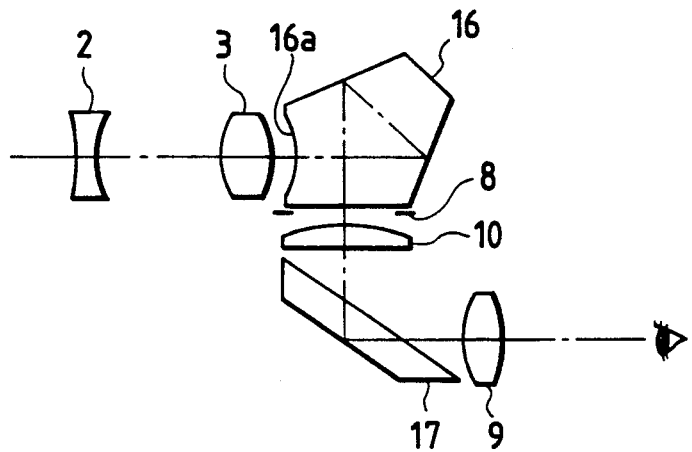
FIG. 18  LOW MAGNIFICATION POSITION
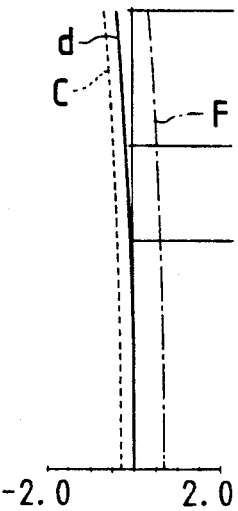
SPHERICAL ABERRATION
PUPIL DIAMETER=2mm
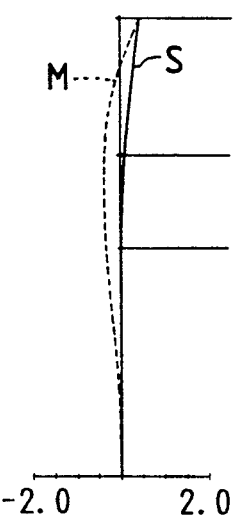
ASTIGMATISM
$\omega=27.7°$
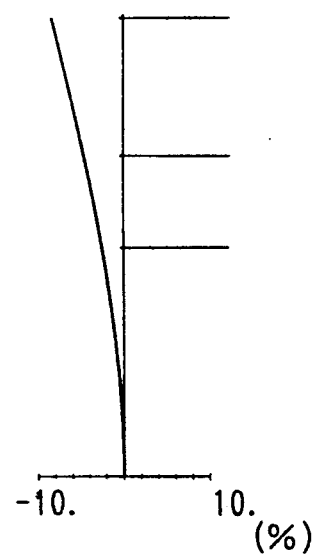
DISTORTION
$\omega=27.7°$
(%)

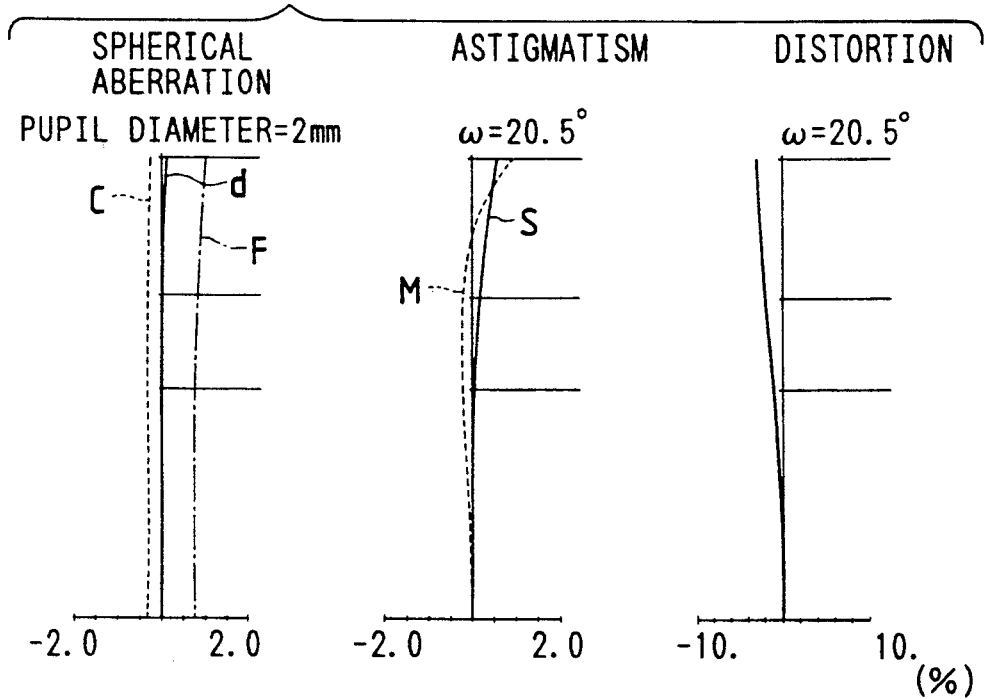
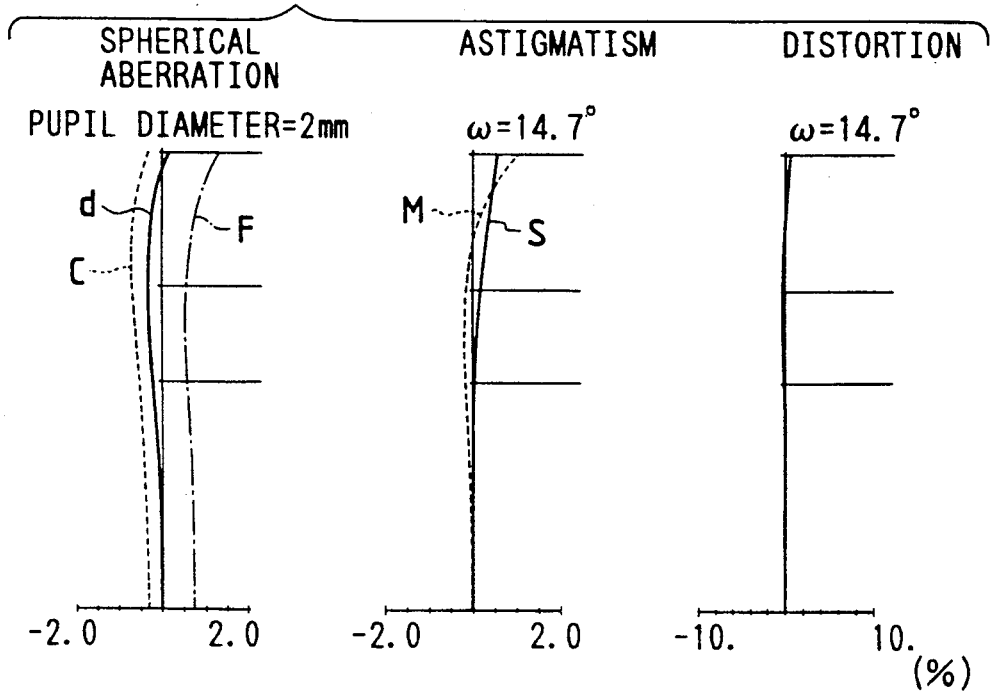

FIG. 21
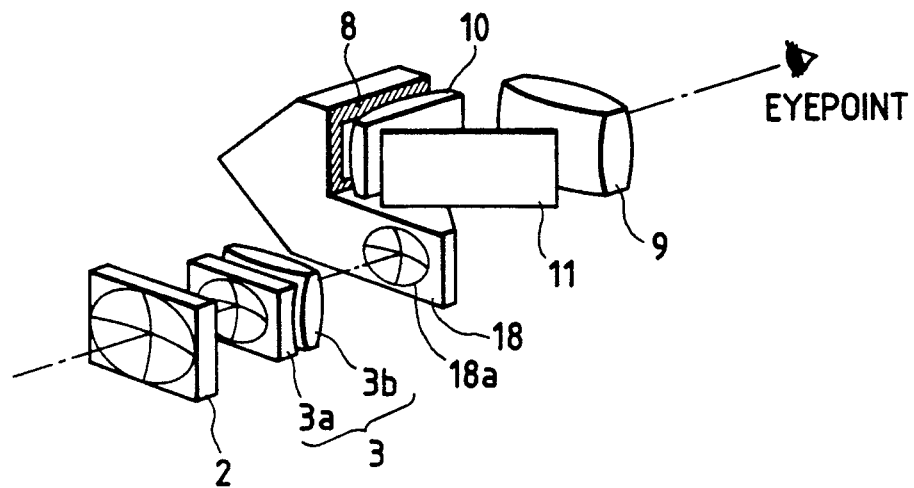
FIG. 23
LOW MAGNIFICATION POSITION
| SPHERICAL ABERRATION | ASTIGMATISM | DISTORTION |
|---|---|---|
| PUPIL DIAMETER=2mm | $\omega=26.2°$ | $\omega=26.2°$ |
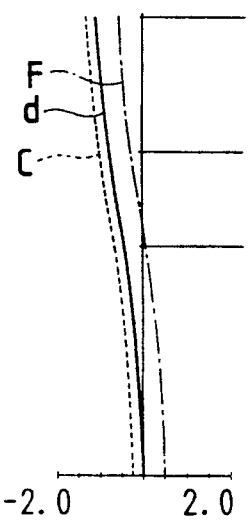
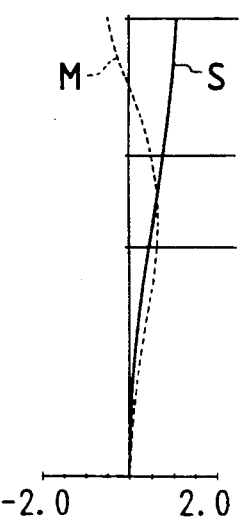
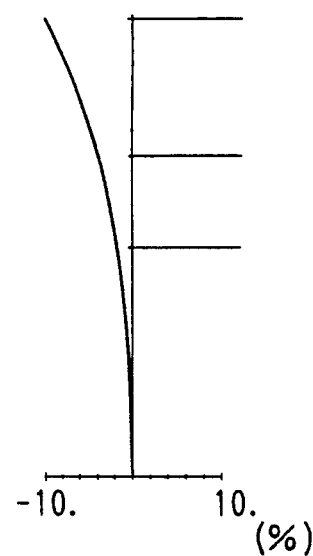
-2.0   2.0     -2.0   2.0     -10.   10.
                                          (%)

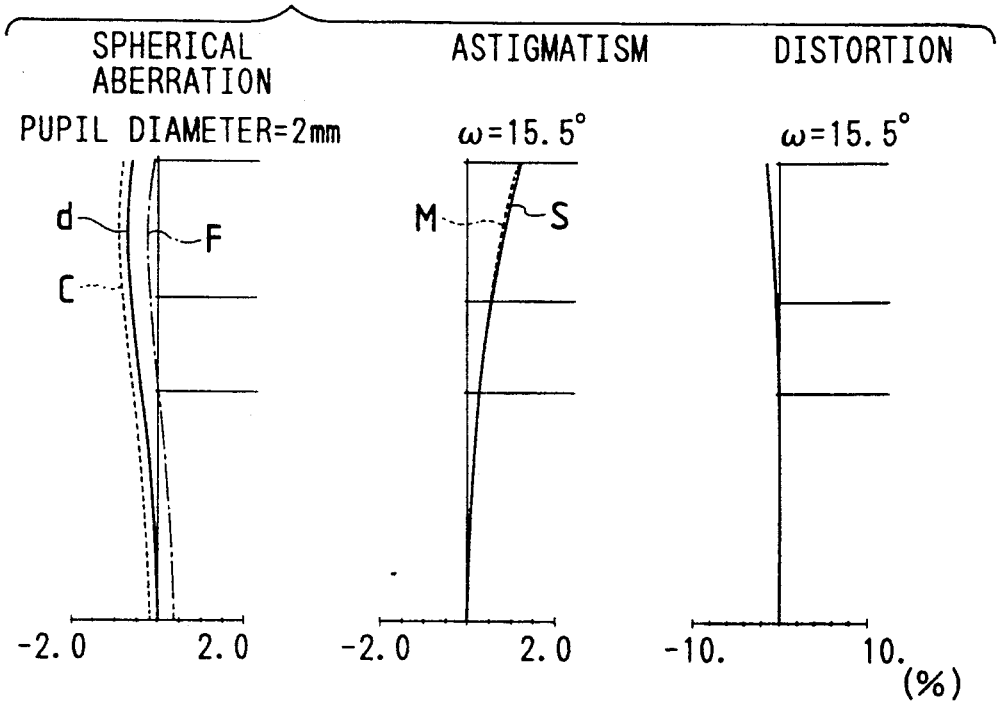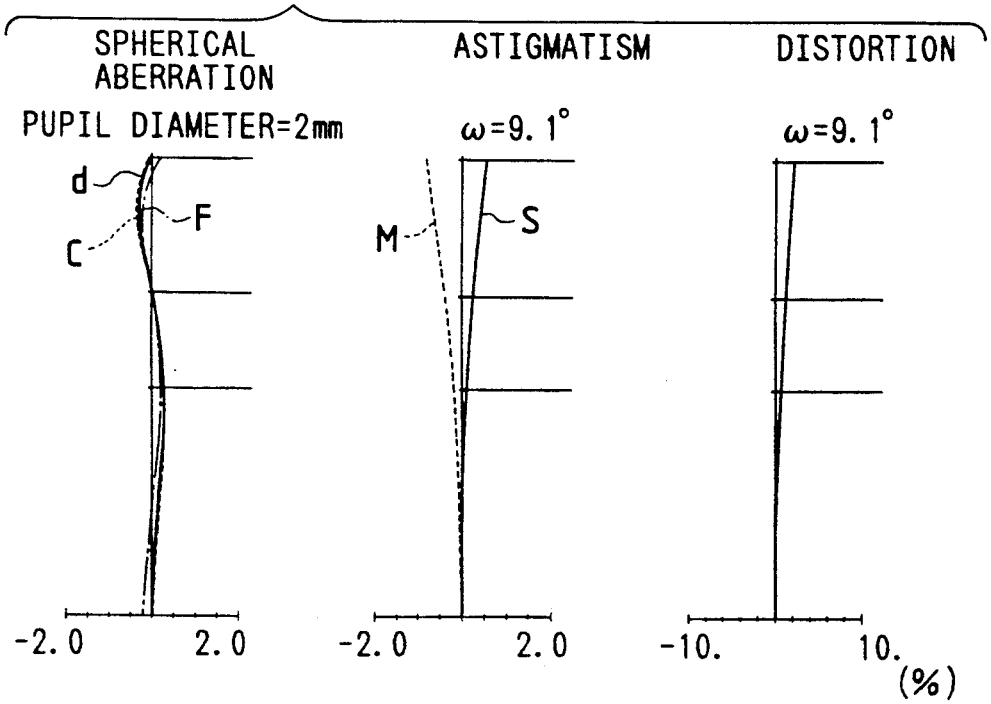

REAL IMAGE MODE VARIABLE MAGNIFICATION FINDER OPTICAL SYSTEM

BACKGROUND OF THE INVENTION a) Field of the Invention

This invention relates to a real image mode variable magnification finder optical system for use in photographic cameras, video cameras, etc.

b) Description of the Prior Art

In a real image mode finder optical system, a Porro prism is frequently used to erect an image for observation, for instance, as set forth in U.S. Pat. No. 4,906,078. This is because the Porro prism can be compactly constructed over optical systems for erecting images such as image rotators and relay optical systems. Such a Porro prism, however, has encountered the problems that in most cases, an intermediate image is formed by an objective lens system, in the vicinity of the entrance surface of the Porro prism integrally constructed in general, and hence an optical system rendering relatively long the back focal distance of the objective lens system, namely, the distance from the rearmost surface of the objective lens system to the position of the intermediate image, will increases the finder length from the entrance surface of the objective lens system to the exit surface of an ocular system.

Thus, an arrangement has been employed from the past such that the intermediate image formed by the objective lens system is positioned within the Porro prism so that the objective lens system is closer to a Porro prism system, and thereby the finder length is reduced.

However, the intermediate image needs to provide a field frame for determining the range of a visual field at its position and, where the intermediate image is positioned within the Porro prism, it is common practice that the Porro prism is divided into a plurality of prisms and the intermediate image is positioned in the resultant space to place the field frame thereat. Unless the back focal distance of the objective lens system is kept to a length adequate for the dividing manner of the prism, the intermediate image will enter the prism, the field frame cannot be disposed, and the finder optical system will become oversized. As such, the optical system involves the difficulties that the optimum range of the back focal distance of the objective lens system is inevitably decreased, which restricts the conditions in the design of the objective lens system and forms one of the causes for deteriorating optical performance.

SUMMARY OF THE INVENTION

It is, therefore, the object of the present invention to provide a real image mode variable magnification finder optical system which, in spite of the optical system for forming an erect image by a Porro prism system constructed of a plurality of reflecting members, decreases in finder length, has favorable optical performance, and is compact in size.

This object is accomplished, according to the present invention, by the arrangement that, in the real image mode finder optical system comprising an objective lens system having a positive refracting power, an image erecting system including a plurality of reflecting members for erecting an intermediate image formed by the objective lens system, and an eyepiece system having a positive refracting power, disposed in order, a first reflecting member of the image erecting system is provided with an entrance surface having a negative refracting power and one or more reflecting surfaces and is configured as a prism satisfying the following condition:

$$B_f/f_w < 0.8$$

where $B_f$ is the axial distance from the exit surface of the first reflecting member to the position of the intermediate image and $f_w$ is the focal length of the objective lens system including the first reflecting member, and a surface having a positive power is disposed in the vicinity of the position of the intermediate image formed by the objective lens system.

In the finder optical system according to the present invention, since the entrance surface of a first prism of the Porro prism divided has a negative refracting power, the entrance surface of the first prism exerts a divergent action on rays of light being converged by the objective lens system and the intermediate image position is thus shifted toward the eyepiece system. Hence, even though the back focal distance from the last surface of the objective lens system to the intermediate image position is too short to secure the optical path length required for the insertion of the first prism of the Porro prism into the back focal distance, the negative refracting power of the entrance surface of the first prism makes it possible to provide the back focal distance with the required optical path length and consequently, the first prism can be inserted into the back focal distance. If, however, the negative refracting power of the entrance surface of the first prism is unnecessarily enhanced to increase the back focal distance, the space between the last surface of the objective lens system and the entrance surface of the first prism will be increased and the finder length from the entrance surface of the objective lens system to the exit surface of the eyepiece system will become greater. If, contrary, the exit surface of the first prism is farther away from the intermediate image position to reduce the finder length, the volume of the Porro prism system will be increased and the height or width thereof will be greater, with the result that the compact design of the finder optical system cannot be realized. As such, when the refracting power of the entrance surface of the first prism is set so as to fulfill the condition: $B_f/f_w < 0.8$, the intermediate image is formed adjacent to the exit surface of the first prism, so that the optical system can be most effectively down-sized.

Further, if a surface having a positive refracting power is disposed at the intermediate image position, it will exert a convergent action on an off-axial beam of light diverging from the objective lens system to enable the beam to approximate parallel rays, and serves as a field lens for downsizing a second prism and the eyepiece system subsequent thereto. The surface having a positive refracting power may well be disposed at the entrance surface of the second prism and also serves as the field lens, without losing the effect of increasing the back focal distance as mentioned above, because it lies adjacent to the intermediate image like the case of the exit surface of the first prism. Also, the second prism may well be substituted by an optical system combining the field lens with a mirror.

The first prism according to the present invention can also be constructed as a prism having reflecting surfaces for twice- or thrice-reflecting the light beam in accordance with the type of the objective lens system, but in general, as the number of reflecting surfaces and the optical path length enlarges, the length from the entrance surface to the exit surface, namely, to the intermediate image increases and the size of the light beam at the entrance surface also increases, so that there is the fear that aberration becomes greater. In such an instance, if the entrance surface is configured as an aspherical surface, aberration can be effectively corrected.

Since, as stated above, the intermediate image position (which coincides with the front focal point of the eyepiece system) brought about by the objective lens system approaches the eyepiece system, thereby allowing the focal length of the eyepiece system to be reduced, a finder magnification $\beta$ can be increased. Here, the finder magnification $\beta$ is the value determined by the ratio of a focal length of the objective lens system $f_T$ to a focal length of the eyepiece system $f_R$: $\beta = f_T/f_R$.

This and other objects as well as the features and the advantages of the present invention will become apparent from the following detailed description of the preferred embodiments when taken in conjunction with the accompanying drawings.

BRIEF DESCRIPTION OF THE DRAWINGS

FIG. 1 is a perspective view showing a first embodiment of the real image mode variable magnification finder optical system according to the present invention;

FIGS. 3 to 5 are aberration curve diagrams at low, moderate, and high magnification positions, respectively, of the first embodiment;

FIG. 6 is a perspective view showing a second embodiment;

FIG. 7 is a developed view at low, moderate, and high magnification positions of the second embodiment;

FIGS. 8 to 10 are aberration curve diagrams at low, moderate, and high magnification positions, respectively, of the second embodiment;

FIG. 11 is a perspective view showing a third embodiment;

FIG. 12 is a developed view at low, moderate, and high magnification positions of the third embodiment;

FIGS. 13 to 15 are aberration curve diagrams at low, moderate, and high magnification positions, respectively, of the third embodiment;

FIG. 16 is a sectional view showing a fourth embodiment;

FIGS. 18 to 20 are aberration curve diagrams at low, moderate, and high magnification positions, respectively, of the fourth embodiments;

FIG. 21 is a perspective view showing a fifth embodiment;

FIGS. 23 to 25 are aberrations curve diagrams at low, moderate, and high magnification positions, respectively, of the fifth embodiment.

DETAILED DESCRIPTION OF THE PREFERRED EMBODIMENTS

Figure 2:
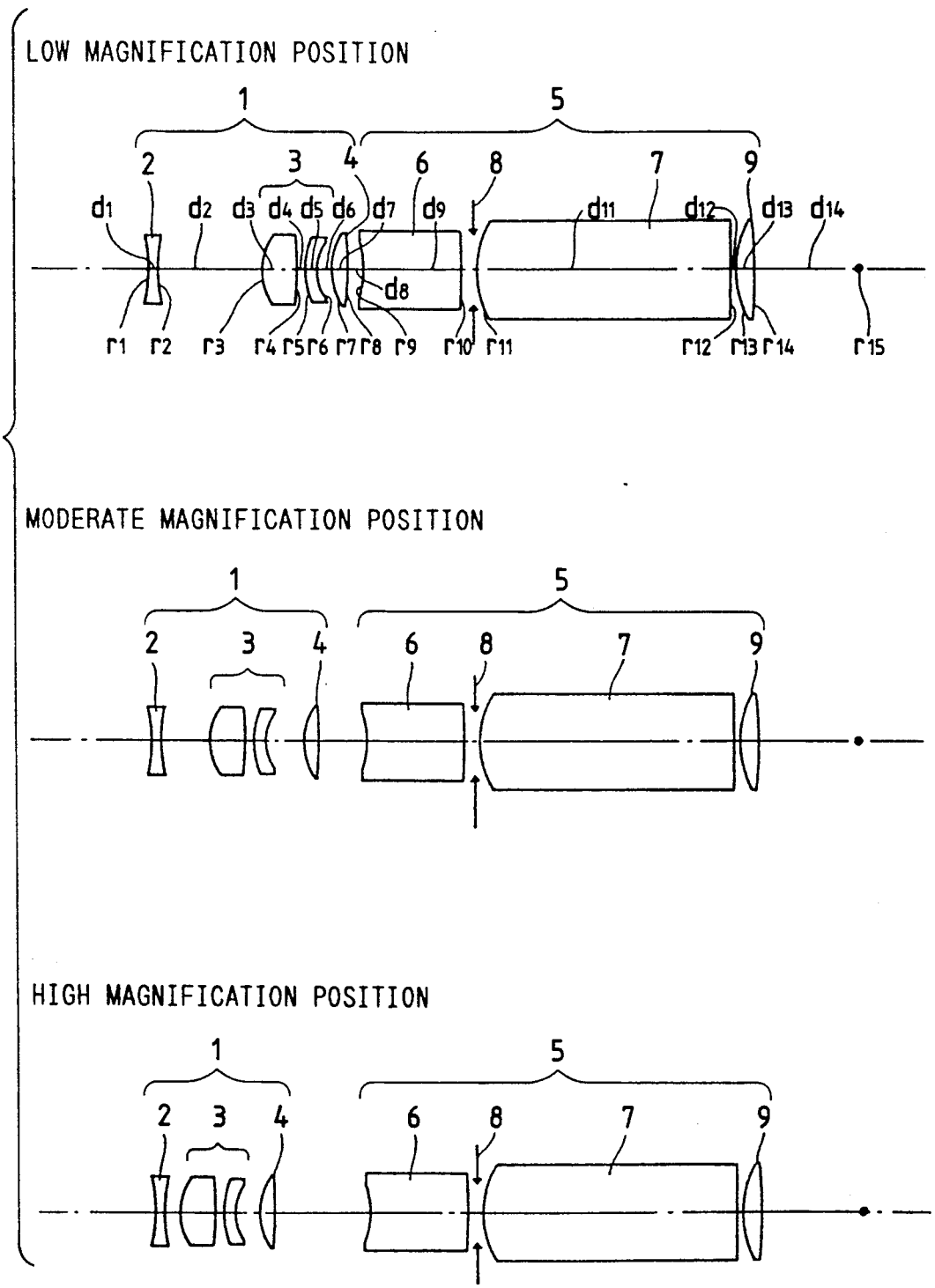
FIG. 2 is a developed view at low, moderate, and high magnification positions of the first embodiment.

Referring now to the drawings, the embodiments of the present invention will be described below.

FIRST EMBODIMENT

FIG. 1 is a perspective view of the first embodiment and FIG. 2 is a developed view at low, moderate, and high magnification positions of the first embodiment.

As shown in these figures, an objective lens system 1 comprises a first lens unit 2 of a negative lens, a second lens unit 3 including a positive lens and a negative lens and having a positive refracting power as a whole, and a third lens unit 4 of a positive lens. As will be apparent from FIG. 2, the second and third lens units 3 and 4 contained in the objective lens system 1 are shifted toward an object while altering the relative space between them, thereby changing the finder magnification from low, through moderate, to high.

An image erecting system 5 comprises a first prism 6 and a second prism 7, which have an image erecting action equivalent to a Porro prism. As will be clear from FIG. 1, the first prism 6 is a rectangular prism whose entrance surface is concave, having a negative refracting power, and whose exit surface is plane, and has a single reflecting surface. The second prism 7 is such that its entrance surface opposite to the exit surface of the first prism 6 is convex, having a positive refractive power, and its exit surface is plane, and has three reflecting surfaces. Between the first prism 6 and the second prism 7, a field frame 8 is disposed. where an intermediate image formed by the objective lens system 1 is located. It follows from this that the entrance surface of the second prism 7 has the action of the field lens. Additionally, by a total of four reflections made by the single reflecting surface of the first prism 6 and the three reflecting surfaces of the second prism 7, the arrangement is made such that the image formed by the objective lens system 1 can be erected.

The intermediate image by the objective lens system 1 is magnified for observation by an eyepiece system 9 composed of a single positive lens.

Also, where the finder optical system is used in a camera, although not shown, a photographic lens system is disposed in parallel with the finder optical system so that the photographic lens system is associated with the finder optical system for a change of magnification.

FIGS. 3 to 5 show aberration curves at low, moderate, and high magnification positions, respectively, of the first embodiment, and the numerical data of the embodiment are as follows:

| | Magnification = 0.45–1.14 Field angle (2ω) = 52.4°–19.8° | | | |
|---|---|---|---|---|
| $r_1 = -13.1360$ | | | | |
| | $d_1 = 1.0000$ | $n_1 = 1.58362$ | | $v_1 = 30.37$ |
| $r_2 = 13.7360$ (aspherical) | | | | |
| | $d_2$ (variable) | | | |
| $r_3 = 5.6100$ (aspherical) | | | | |
| | $d_3 = 4.1750$ | $n_2 = 1.49230$ | | $v_2 = 57.71$ |
| $r_4 = -43.8590$ | | | | |
| | $d_4 = 1.0220$ | | | |
| $r_5 = 9.8180$ | | | | |
| | $d_5 = 1.2930$ | $n_3 = 1.58362$ | | $v_3 = 30.37$ |
| $r_6 = 4.9250$ | | | | |
| | $d_6$ (variable) | | | |
| $r_7 = 6.9330$ | | | | |

-continued (aspherical)

$r_8 = -75.4320$

| | $d_7 = 1.7970$ | $n_4 = 1.49230$ | $\nu_4 = 57.71$ |
|---|---|---|---|
| | $d_8$ (variable) | | |

$r_9 = -10.8400$ $r_{10} = -79.7800$

| | $d_9 = 11.4120$ | $n_5 = 1.49230$ | $\nu_5 = 57.71$ |
|---|---|---|---|
| | $d_{10} = 1.9200$ | | |

$r_{11} = 10.4590$ $r_{12} = \infty$

| | $d_{11} = 29.7810$ | $n_6 = 1.49230$ | $\nu_6 = 57.71$ |
|---|---|---|---|
| | $d_{12} = 0.7000$ | | |

$r_{13} = 12.6840$
(aspherical)

$r_{14} = -54.8790$

| | $d_{13} = 2.0780$ | $n_7 = 1.49230$ | $\nu_7 = 57.71$ |
|---|---|---|---|
| | $d_{14} = 15.0000$ | | |

$r_{15}$ (eyepoint)

Aspherical coefficients

Second surface
$E = -0.1448 \times 10^{-3}$, $F = -0.81420 \times 10^{-5}$,
$G = 0.5918 \times 10^{-6}$ Third surface
$E = -0.77814 \times 10^{-3}$, $F = -0.55677 \times 10^{-5}$,
$G = -0.53661 \times 10^{-6}$ Seventh surface
$E = -0.29784 \times 10^{-3}$, $F = 0.20740 \times 10^{-5}$,
$G = -0.21629 \times 10^{-6}$ Thirteenth surface
$E = -0.71782 \times 10^{-4}$, $F = -0.14630 \times 10^{-5}$,
$G = 0.31012 \times 10^{-7}$ Zoom data

| | Low magnification | Moderate magnification | High magnification |
|---|---|---|---|
| $d_2$ | 12.296 | 5.823 | 1.851 |
| $d_6$ | 1.782 | 4.643 | 2.961 |
| $d_8$ | 1.957 | 5.569 | 11.223 |

$B_f/f_w = 0.20$

SECOND EMBODIMENT

FIG. 6 is a perspective view of the second embodiment and FIG. 7 is a developed view at low, moderate, and high magnification positions of the second embodiment.

As depicted in these figures, the basic arrangement is identical with that of the first embodiment. The second embodiment, although the objective lens system 1 includes the first lens unit 2 to the third lens unit 4, is different from the first embodiment in arrangement that the second lens unit 3 is composed of a single positive lens. Also, the image erecting system 5 is divided into the first prism 6 and the second prism 7, each of which has two reflecting surfaces.

FIGS. 8 to 10 show aberration curves at low, moderate, and high magnification positions, respectively, of the second embodiments, and the numerical data of the embodiment are as follows:

| | Magnification = 0.42–0.76 Field angle (2ω) = 52.8°–28.2° | | |
|---|---|---|---|
| $r_1 = -10.1420$ | | | |
| | $d_1 = 1.0000$ | $n_1 = 1.58362$ | $\nu_1 = 30.37$ |
| $r_2 = 6.7010$ (aspherical) | | | |
| | $d_2$ (variable) | | |
| $r_3 = 6.1200$ (aspherical) | | | |
| | $d_3 = 1.4730$ | $n_2 = 1.49230$ | $\nu_2 = 57.71$ |
| $r_4 = -83.9140$ | | | |
| | $d_4$ (variable) | | |
| $r_5 = 16.1990$ | | | |

-continued (aspherical)

$r_6 = -7.1150$

| | $d_5 = 4.1210$ | $n_3 = 1.49230$ | $\nu_3 = 57.71$ |
|---|---|---|---|
| | $d_6$ (variable) | | |

$r_7 = -18.5620$ $r_8 = \infty$

| | $d_7 = 18.4000$ | $n_4 = 1.49230$ | $\nu_4 = 57.71$ |
|---|---|---|---|
| | $d_8 = 1.0000$ | | |

$r_9 = 10.4460$ $r_{10} = \infty$

| | $d_9 = 29.2570$ | $n_5 = 1.49230$ | $\nu_5 = 57.71$ |
|---|---|---|---|
| | $d_{10} = 1.5000$ | | |

$r_{11} = 10.6420$
(aspherical)

$r_{12} = 301.7560$

| | $d_{11} = 4.7960$ | $n_6 = 1.49230$ | $\nu_6 = 57.71$ |
|---|---|---|---|
| | $d_{12} = 15.0000$ | | |

$r_{13}$ (eyepoint)

Aspherical coefficients

Second surface
$E = -0.11968 \times 10^{-2}$, $F = -0.11931 \times 10^{-4}$,
$G = -0.73834 \times 10^{-5}$ Third surface
$E = -0.11077 \times 10^{-2}$, $F = 0.55752 \times 10^{-4}$,
$G = -0.15633 \times 10^{-4}$ Fifth surface
$E = -0.11892 \times 10^{-2}$, $F = -0.30248 \times 10^{-4}$,
$G = 0.52155 \times 10^{-5}$ Eleventh surface
$E = -0.12684 \times 10^{-3}$, $F = -0.10063 \times 10^{-5}$,
$G = 0.57479 \times 10^{-8}$ Zoom data

| | Low magnification | Moderate magnification | High magnification |
|---|---|---|---|
| $d_2$ | 3.989 | 1.916 | 0.933 |
| $d_4$ | 3.417 | 2.717 | 1.000 |
| $d_6$ | 1.000 | 3.773 | 6.473 |

$B_f/f_w = 0$

THIRD EMBODIMENT

FIG. 11 is a perspective view of the third embodiment and FIG. 12 is a developed view at low, moderate, and high magnification positions of the third embodiment.

This embodiment is constructed so that the objective lens system 1 includes the first lens unit 2 of a negative lens and the second lens unit 3 composed of two positive lenses, each unit of which is moved, thereby changing the finder magnification from low, through moderate, to high.

The image erecting system 5 comprises the first prism 6, a field lens 10, and a mirror 11. The first prism 6 possesses three reflecting surfaces, the field lens 10 is disposed just above the exit surface of the first prism 6, and the mirror 11 is further disposed above the field lens 10, which have the same action as the Porro prism as a whole. The field frame 8 lies between the exit surface of the first prism 6 and the field lens 10.

FIGS. 13 to 15 depict aberration curves at low, moderate, and high magnification positions, respectively, of the third embodiment, and the numerical data of the embodiment are as follows:

| | Magnification = 0.45–1.15 Field angle (2ω) = 52.0°–20.0° | | |
|---|---|---|---|
| $r_1 = -14.9140$ | | | |
| | $d_1 = 1.0000$ | $n_1 = 1.58362$ | $\nu_1 = 30.37$ |
| $r_2 = 16.6510$ (aspherical) | | | |
| | $d_2$ (variable) | | |

-continued

| | | | |
|---|---|---|---|
| $r_3 = -9.0540$ | | | |
| | $d_3 = 2.8110$ $n_2 = 1.49230$ | $\nu_2 = 57.71$ |
| $r_4 = -7.6940$ | | | |
| | $d_4 = 0.1000$ | | |
| $r_5 = 10.8890$ | | | |
| | $d_5 = 2.3350$ $n_3 = 1.49230$ | $\nu_3 = 57.71$ |
| $r_6 = -20.7890$ (aspherical) | | | |
| | $d_6$ (variable) | | |
| $r_7 = -49.1540$ | | | |
| | $d_7 = 30.0000$ $n_4 = 1.49230$ | $\nu_4 = 57.71$ |
| $r_8 = \infty$ | | | |
| | $d_8 = 1.0000$ | | |
| $r_9 = 14.3780$ | | | |
| | $d_9 = 2.0000$ $n_5 = 1.49230$ | $\nu_5 = 57.71$ |
| $r_{10} = \infty$ | | | |
| | $d_{10} = 18.0904$ | | |
| $r_{11} = 64.6310$ | | | |
| | $d_{11} = 2.1470$ $n_6 = 1.49230$ | $\nu_6 = 57.71$ |
| $r_{12} = -12.8090$ (aspherical) | | | |
| | $d_{12} = 15.0000$ | | |
| $r_{13}$ (eyepoint) | | | |

Aspherical coefficients

Second surface
$E = -0.33284 \times 10^{-3}$, $F = 0.21273 \times 10^{-4}$,
$G = -0.16750 \times 10^{-5}$
Sixth surface
$E = 0.25866 \times 10^{-3}$, $F = -0.19639 \times 10^{-5}$,
$G = 0.63589 \times 10^{-7}$
Twelfth surface
$E = 0.11251 \times 10^{-3}$, $F = 0.31703 \times 10^{-6}$,
$G = 0.62827 \times 10^{-8}$ Zoom data

| | Low magnification | Moderate magnification | High magnification |
|---|---|---|---|
| $d_2$ | 13.228 | 5.976 | 1.720 |
| $d_6$ | 1.000 | 5.101 | 11.252 |

$B_f/f_w = 0$

FOURTH EMBODIMENT

Figure 17:
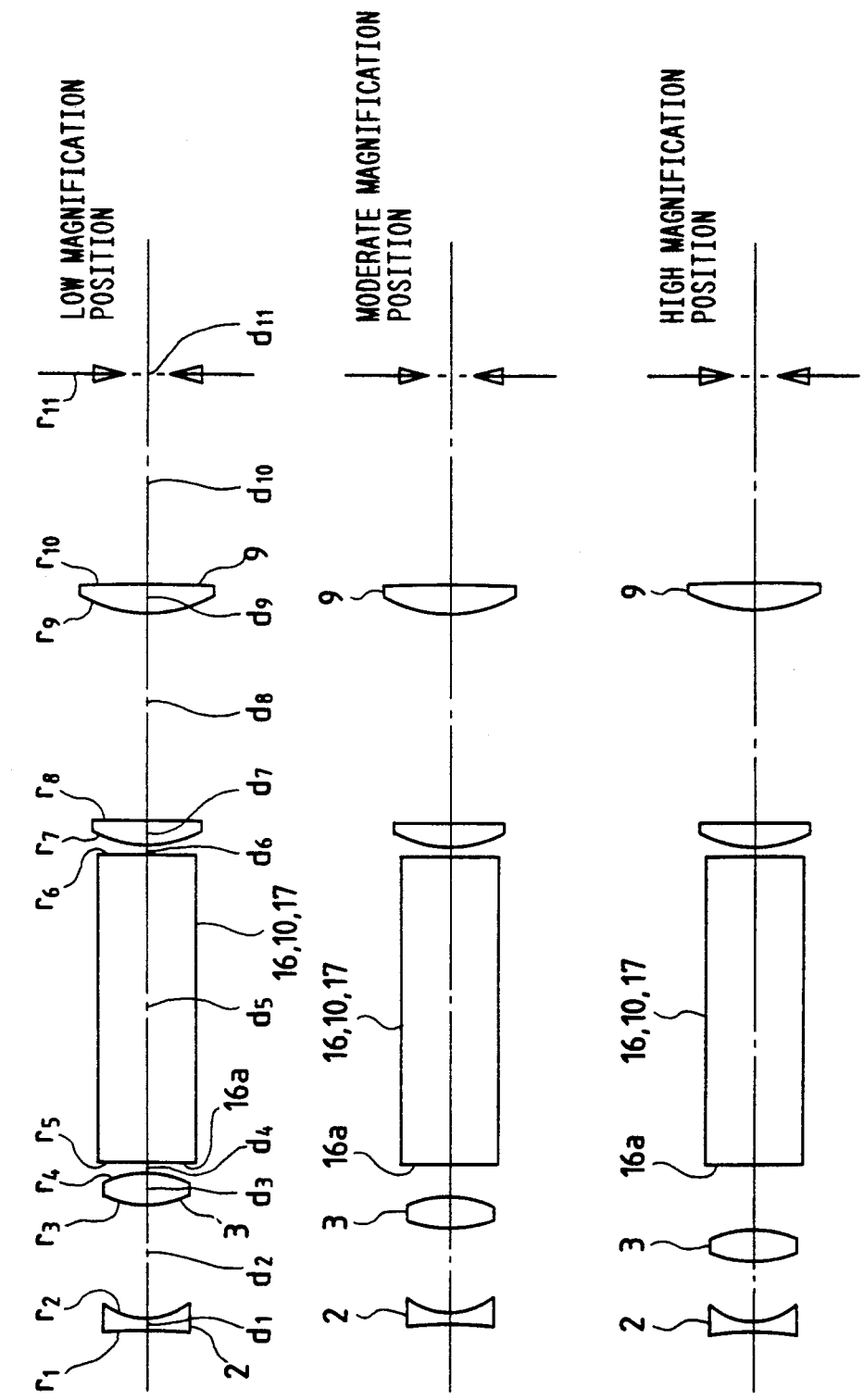
FIG. 17 is a developed view at low, moderate, and high magnification positions of the fourth embodiment.

FIGS. 16 to 20 show the fourth embodiment of the present invention, in which FIG. 16 is a view showing the arrangement of the real image mode variable magnification finder optical system, FIG. 17 is a developed view, along an optical axis, of the optical system shown in FIG. 16 at low, moderate, and high magnification positions, and FIGS. 18 to 20 are views showing aberration curves at low, moderate, and high magnification positions, respectively.

In these figures, behind the second lens unit 3 is disposed a pentagonal prism 16, whose entrance surface 16a is configured as a concave. Further, a Dach mirror 17 is disposed behind the prism 16 and, between the prism 16 and the mirror 17, the field frame 8 and the field lens 10 are disposed in order from the object side.

The numerical data of the fourth embodiment are as follows:

Magnification = 0.40–0.73
Field angle $(2\omega)$ = 55.3°–29.3°
$f_3/f_r = -2.78$

| | | | |
|---|---|---|---|
| $r_1 = -42.3175$ | | | |
| | $d_1 = 1.000$ $n_1 = 1.58423$ | $\nu_1 = 30.49$ |
| $r_2 = 5.2759$ (aspherical) | | | |
| | $d_2$ (variable) | | |
| $r_3 = 7.7737$ | | | |
| | $d_3 = 2.932$ $n_2 = 1.49241$ | $\nu_2 = 57.66$ |
| $r_4 = -8.0406$ (aspherical) | | | |

-continued

| | | | |
|---|---|---|---|
| | $d_4$ (variable) | | |
| $r_5 = -24.9060$ (aspherical) | | | |
| | $d_5 = 29.000$ $n_3 = 1.58423$ | $\nu_3 = 30.49$ |
| $r_6 = \infty$ | | | |
| | $d_6 = 1.000$ | | |
| $r_7 = -11.4530$ | | | |
| | $d_7 = 2.040$ $n_4 = 1.49241$ | $\nu_4 = 57.66$ |
| $r_8 = \infty$ | | | |
| | $d_8 = 19.418$ | | |
| $r_9 = 11.4695$ (aspherical) | | | |
| | $d_9 = 2.567$ $n_5 = 1.49241$ | $\nu_5 = 57.66$ |
| $r_{10} = -208.5849$ | | | |
| | $d_{10} = 20.000$ | | |
| $r_{11}$ (eyepoint) | | | |

Aspherical coefficients

Second surface
$E = 0.61011 \times 10^{-4}$, $F = -0.48497 \times 10^{-4}$,
$G = 0.52489 \times 10^{-6}$
Fourth surface
$E = 0.70968 \times 10^{-3}$, $F = 0.87197 \times 10^{-5}$,
$G = -0.25680 \times 10^{-6}$
Fifth surface
$E = -0.43545 \times 10^{-3}$, $F = 0.11683 \times 10^{-4}$,
$G = 0.17403 \times 10^{-5}$
Ninth surface
$E = -0.11459 \times 10^{-3}$, $F = -0.54677 \times 10^{-6}$,
$G = -0.25638 \times 10^{-8}$ Zoom data

| | Low magnification | Moderate magnification | High magnification |
|---|---|---|---|
| $d_2$ | 11.068 | 8.225 | 5.827 |
| $d_4$ | 1.000 | 3.061 | 6.242 |
| $\beta_2$ | −0.738 | −0.978 | −1.348 |

FIFTH EMBODIMENT

Figure 22:
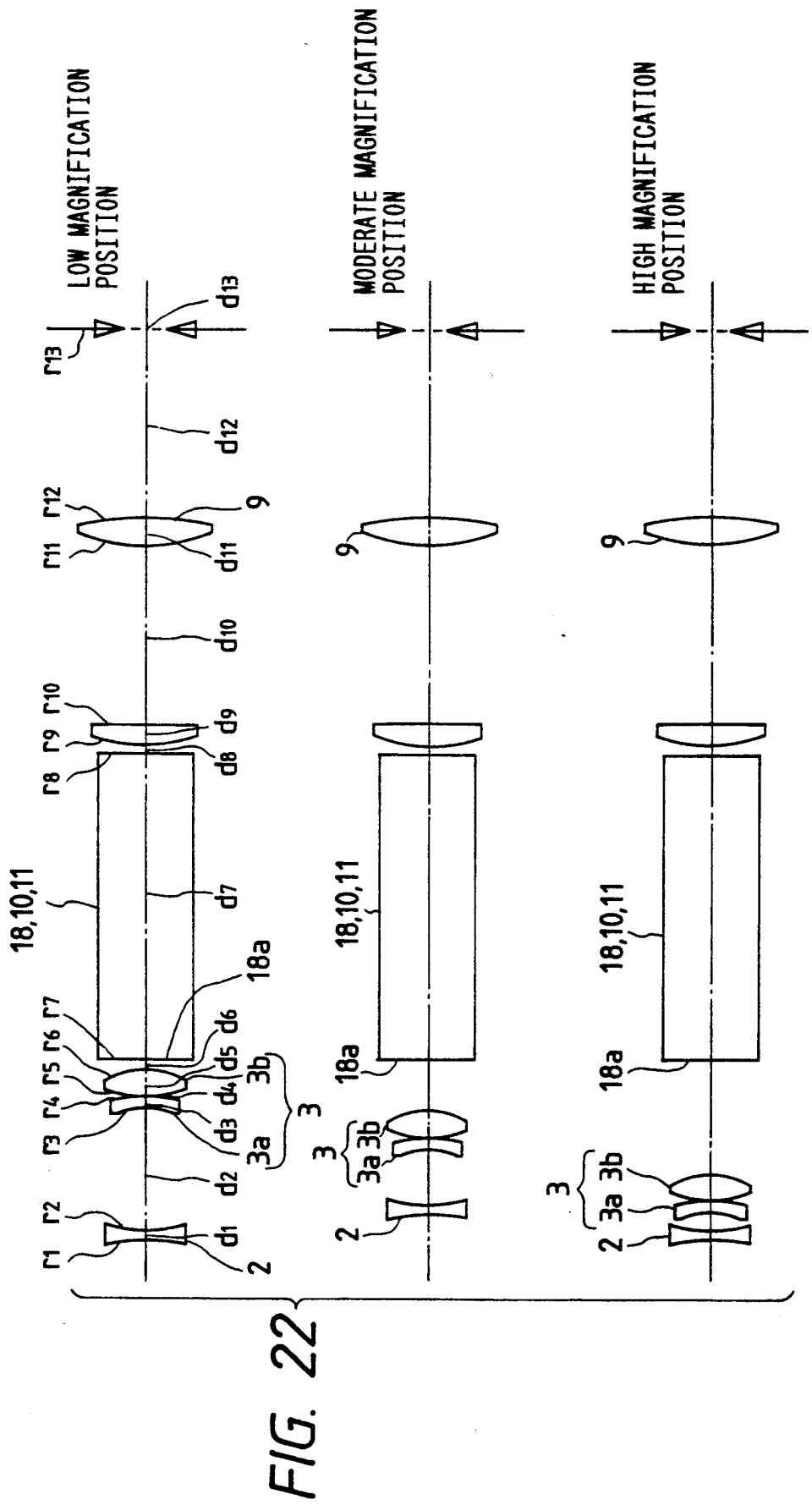
FIG. 22 is a developed view at low, moderate, and high magnification positions of the fifth embodiment.

FIGS. 21 to 25 shows the fifth embodiment of the present invention. FIG. 21 is a view showing the arrangement of the real image mode variable magnification finder optical system, FIG. 22 is a developed view, along the optical axis, of the optical system shown in FIG. 21 at low, moderate, and high magnification positions, and FIGS. 23 to 25 are views showing aberration curves at low, moderate, and high magnification positions, respectively.

In these figures, the second lens unit 3 comprises a negative lens 3a and a positive lens 3b and has a positive refracting power as a whole. Behind the second lens unit 3 is disposed a Porro prism 18 whose entrance surface 18a is configured as a concave and which reflects thrice a beam of light. Further, the planar mirror 11 for bending the light beam toward the eyepiece system 9 is provided in rear of the field frame 8 and the field lens 10.

The numerical data of the fifth embodiment are as follows:

Magnification = 0.45–1.15
Field angle $(2\omega)$ = 52.4°–19.2°
$f_3/f_r = -4.90$

| | | | |
|---|---|---|---|
| $r_1 = -19.1577$ | | | |
| | $d_1 = 1.000$ $n_1 = 1.58423$ | $\nu_1 = 30.49$ |
| $r_2 = 12.9702$ (aspherical) | | | |
| | $d_2$ (variable) | | |
| $r_3 = -7.7070$ | | | |
| | $d_3 = 1.091$ $n_2 = 1.58423$ | $\nu_2 = 30.49$ |
| $r_4 = -12.5496$ | | | |
| | $d_4 = 0.100$ | | |

-continued

| | | | |
|---|---|---|---|
| $r_5 = 9.4528$ (aspherical) | | | |
| | $d_5 = 2.558$ | $n_3 = 1.49241$ | $\nu_3 = 57.66$ |
| $r_6 = -7.6280$ | | | |
| | $d_6$ (variable) | | |
| $r_7 = -69.1753$ (aspherical) | | | |
| | $d_7 = 30.391$ | $n_4 = 1.58423$ | $\nu_4 = 30.49$ |
| $r_8 = \infty$ | | | |
| | $d_8 = 1.000$ | | |
| $r_9 = 16.3132$ | | | |
| | $d_9 = 2.000$ | $n_5 = 1.49241$ | $\nu_5 = 57.66$ |
| $r_{10} = \infty$ | | | |
| | $d_{10} = 18.350$ | | |
| $r_{11} = 19.0196$ | | | |
| | $d_{11} = 2.760$ | $n_6 = 1.49241$ | $\nu_6 = 57.66$ |
| $r_{12} = -23.4716$ (aspherical) | | | |
| | $d_{12} = 19.492$ | | |
| $r_{13}$ (eyepoint) | | | |

Aspherical coefficients

Second surface
$E = -0.67323 \times 10^{-3}$, $F = 0.91037 \times 10^{-4}$,
$G = -0.45416 \times 10^{-5}$
Fifth surface
$E = -0.11046 \times 10^{-2}$, $F = 0.17146 \times 10^{-4}$,
$G = -0.16475 \times 10^{-6}$
Seventh surface
$E = -0.16132 \times 10^{-3}$, $F = 0.15206 \times 10^{-4}$,
$G = -0.57595 \times 10^{-6}$
Twelfth surface
$E = 0.49226 \times 10^{-4}$, $F = 0.11236 \times 10^{-5}$,
$G = -0.16790 \times 10^{-7}$ Zoom data

| | Low magnification | Moderate magnification | High magnification |
|---|---|---|---|
| $d_2$ | 12.251 | 5.619 | 1.725 |
| $d_6$ | 1.000 | 5.193 | 11.527 |
| $\beta_2$ | −0.622 | −1.009 | −1.590 |

In each of the above embodiments, reference symbols $r_1, r_2, \ldots$ represent radii of curvature of individual lens surfaces, $d_1, d_2, \ldots$ thicknesses of individual lenses and spaces therebetween, $n_1, n_2, \ldots$ refractive indices of individual lenses, $\nu_1, \nu_2, \ldots$ Abbe's numbers of individual lenses, and E, F and G aspherical coefficients of fourth, sixth and eighth orders, respectively.

Also, the configurations of the aspherical surfaces in each embodiment are expressed by the following equation using the aspherical coefficients:

$$X = \frac{Y^2/r}{1 + \sqrt{1 - (Y^2/r^2)}} + EY^4 + FY^6 + GY^8$$

where X represents the coordinates in a direction of the optical axis, Y the coordinates in a direction normal to the optical axis, and r the paraxial radius of curvature.

Also, although the optical element of the objective lens in each embodiment is made of plastic, it may be constructed of glass if its cost is put on a commercial basis.

What is claimed is:

1. A real image mode variable magnification finder optical system comprising, in order from an object side:
   an objective lens system having a positive refracting power as a whole;
   an image erecting system having a plurality of reflecting surfaces, for erecting an intermediate image formed by said objective lens system; and
   an eyepiece system having a positive refractive power as a whole,
   wherein at least one of the reflecting surfaces of said image erecting system is constructed of a reflecting member having an entrance surface of a negative refracting power, wherein said intermediate image is disposed closer to said eyepiece system than an exit surface of said reflecting member, and wherein a surface having a positive refracting power is disposed adjacent to said intermediate image.

2. The finder optical system according to claim 1, wherein said reflecting member has four reflecting surfaces and wherein the surface having a positive refracting power, disposed adjacent to said intermediate image is configured as a positive lens.

3. The finder optical system according to claim 1, wherein the surface having a positive refracting power disposed adjacent to said intermediate image is constructed of a reflecting member having at least one reflecting surface.

4. The finder optical system according to claim 1, wherein said objective lens system includes a first lens unit having a negative refracting power and a second lens unit having a positive refracting power.

5. The finder optical system according to claim 4, wherein said second lens unit is moved toward an object so that a change of magnification is performed.

6. The finder optical system according to claim 1, wherein said objective lens system includes a first lens unit having a negative refracting power, a second lens unit having a positive refracting power, and a third lens unit having a positive refracting power.

7. The finder optical system according to claim 6, wherein said second lens unit is moved toward an object and said third lens unit is also moved toward the object so that a change of magnification is carried out.

* * * * *